(12) United States Patent
Hiraide

(10) Patent No.: US 9,465,217 B2
(45) Date of Patent: Oct. 11, 2016

(54) VIRTUAL IMAGE DISPLAY APPARATUS

(71) Applicant: SEIKO EPSON CORPORATION, Tokyo (JP)

(72) Inventor: Noriaki Hiraide, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 50 days.

(21) Appl. No.: 14/260,982

(22) Filed: Apr. 24, 2014

(65) Prior Publication Data

US 2014/0327603 A1    Nov. 6, 2014

(30) Foreign Application Priority Data

May 2, 2013    (JP) ................................ 2013-096767

(51) Int. Cl.
   *G09G 5/00* (2006.01)
   *G02B 27/01* (2006.01)

(52) U.S. Cl.
   CPC ... *G02B 27/0172* (2013.01); *G02B 2027/0178* (2013.01)

(58) Field of Classification Search
   None
   See application file for complete search history.

(56) References Cited

U.S. PATENT DOCUMENTS

| | | | | |
|---|---|---|---|---|
| 2010/0073262 | A1* | 3/2010 | Matsumoto | G02B 27/0176 345/8 |
| 2010/0103078 | A1* | 4/2010 | Mukawa et al. | 345/8 |
| 2011/0012814 | A1* | 1/2011 | Tanaka | 345/8 |
| 2011/0234476 | A1* | 9/2011 | Sugihara et al. | 345/8 |
| 2011/0241975 | A1* | 10/2011 | Mukawa et al. | 345/8 |
| 2012/0086623 | A1* | 4/2012 | Takagi et al. | 345/7 |
| 2012/0200477 | A1 | 8/2012 | Fujishiro | |
| 2012/0242561 | A1* | 9/2012 | Sugihara | 345/8 |
| 2012/0306940 | A1* | 12/2012 | Machida | G02B 6/005 345/690 |
| 2013/0120224 | A1* | 5/2013 | Cajigas | G09G 5/00 345/8 |
| 2013/0235331 | A1* | 9/2013 | Heinrich | G02C 11/10 351/158 |
| 2013/0258271 | A1* | 10/2013 | Cazalet | G02C 5/16 351/155 |

FOREIGN PATENT DOCUMENTS

JP    A-2012-163640    8/2012

* cited by examiner

*Primary Examiner* — Christopher R Lamb
(74) *Attorney, Agent, or Firm* — Oliff PLC

(57) ABSTRACT

An optical unit housing section and a light guide device are supported by a frame. Durability of sections having an optical function in an entire apparatus is maintained. The frame is arranged on a side closer to the nose of an observer than the optical unit housing section and reduced in size. Consequently, a virtual image display apparatus can give an impression that the virtual image display apparatus is small in size in appearance as a whole. Further, it is possible to attain a reduction in the weight of the entire virtual image forming apparatus. Compared with a structure in which the entire apparatus is covered with a case-like member, the virtual image display apparatus can be formed in a shape closer to a form of eyeglasses. It is possible to attain design with apparent voluminousness suppressed.

10 Claims, 10 Drawing Sheets

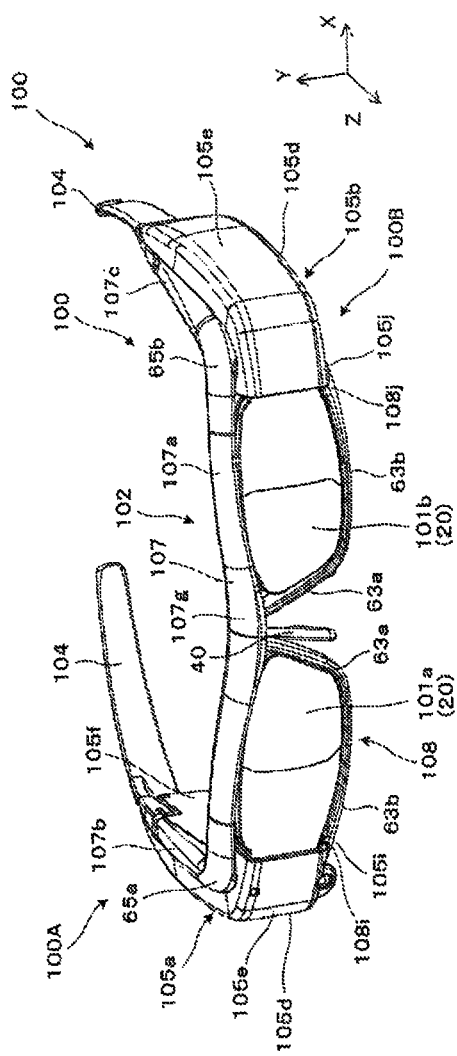
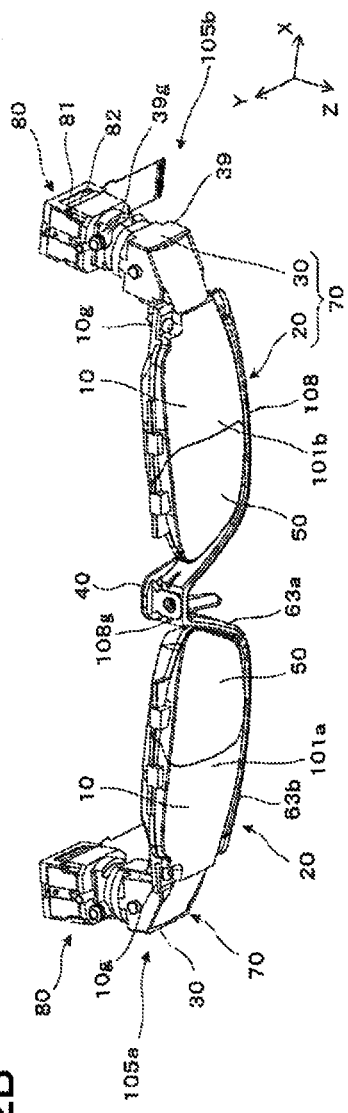
FIG.2A
FIG.2B

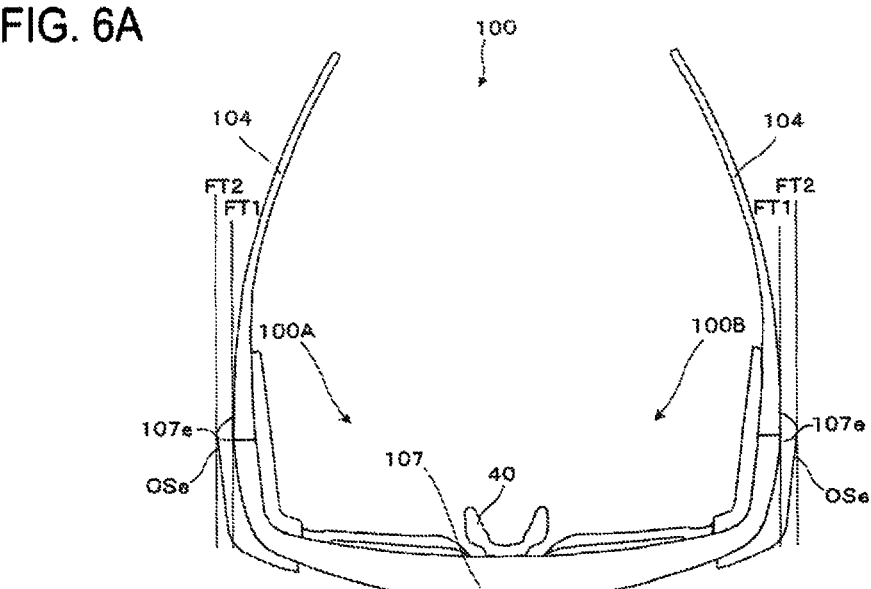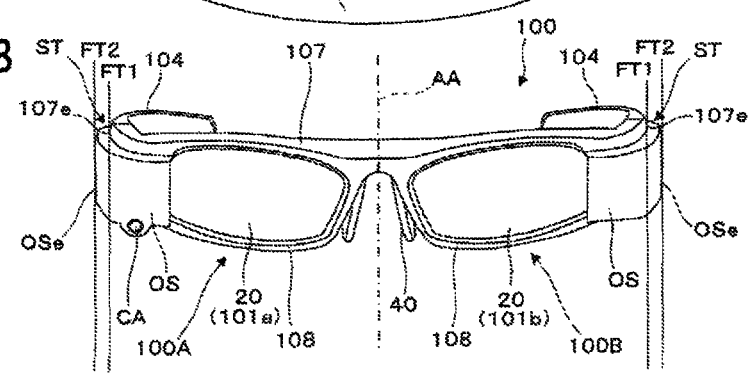

VIRTUAL IMAGE DISPLAY APPARATUS

BACKGROUND

1. Technical Field

The present invention relates to a virtual image display apparatus and a projector that present a video formed by a video display apparatus to an observer and, more particularly, to a virtual image display apparatus suitable for a head mounted display mounted on the head of the observer.

2. Related Art

Various virtual image display apparatuses are proposed as a virtual image display apparatus such as a head mounted display (hereinafter also referred to as HMD) mounted on the head of an observer (see, for example, JP-A-2012-163640 (Patent Literature 1)).

The virtual image display apparatus such as the HMD is desired to attain an increase in an angle of view without deteriorating image quality while being reduced in size and weight. If the virtual image display apparatus covers the entire visual field of the observer to allow the observer to see only video light, the observer cannot see a state of the outside world and feels uneasiness. A new use such as virtual reality is created by superimposing and displaying the outside world and a video and allowing the observer to see the video through the outside world. Therefore, there is a demand for a display that displays video image light to be superimposed on the outside world without hindering a visual field of the outside world.

Taking into account the situation explained above, a transparent light guide device arranged in front of the eyes of the observer by see-through is used. Consequently, it is possible to form a virtual image display apparatus in a form close to eyeglasses, improve a wearing feeling, and improve an apparent form. In this case, it is conceivable that an optical system for causing the observer to visually recognize an image has, for example, a form for guiding video light formed by a liquid crystal display panel arranged on a head side surface and a projection optical device to the front of the eyes using a transparent prism (see Patent Literature 1).

However, the virtual image display apparatus is mounted with an optical unit such as a liquid crystal display panel. Therefore, for example, as disclosed in Patent Literature 1, when a video display device and a projection optical system are arranged on the side head of the observer, since large devices are present around the side head, compared with the normal eyeglasses, protrusions are extremely conspicuous when the virtual image display apparatus is worn. The appearance of the virtual image display apparatus tends to be deteriorated.

On the other hand, from the viewpoint of protection of an optical system, for example, it is also conceivable to form an external appearance using a case-like member for protecting the entire optical system. However, in this case, the shape of the virtual image display apparatus tends to increase and the weight also tends to increase. When long-time use and convenience for carry-out and the like are taken into account, as the HMD, it is desirable that the virtual image display apparatus is small in size and weight as much as possible.

SUMMARY

An advantage of some aspects of the invention is to provide a virtual image display apparatus that is small in size and weight, durable, and excellent in design properties with apparent voluminousness suppressed.

An aspect of the invention is directed to a virtual image display apparatus including: a video device; an optical unit housing section configured to house an optical unit including the video device; a light guide device arranged in front of the eyes of an observer and configured to direct light emitted from the optical unit including the video device to the eyes of the observer and cause the observer to visually recognize an image; and a frame configured to support at least the optical unit housing section among components for image formation. An outer edge of the frame is arranged on a side closer to a position where the nose of the observer should be arranged in the lateral direction in which the eyes of the observer range than an outer edge of the optical unit housing section. The outer edge of the frame is arranged on the side closer to the position of the nose of the observer in the lateral direction in which the eyes of the observer range than the outer edge of the optical unit housing section. This means that, when the virtual image display apparatus is worn, when portions most distant from the position of the nose of the observer in the lateral direction in which the eyes of the observer range are compared concerning the outer edge of the frame and the outer edge of the optical unit housing section, the portion of the frame is present in a position closer to the nose of the observer than the portion of the optical unit housing section. For example, when the virtual image display apparatus is a binocular vision type of a pair of left and right eyes, the frame is relatively closer to the center. In other words, compared with the frame, the optical unit housing section has a portion projecting to the outer side. When the frame supports an object such as the optical unit housing section, this not only means that the object is directly assembled to the frame to maintain a state in which the frame fixes the object but also means that, as a result, the object is fixed, that is, indirectly supported.

In the virtual image display apparatus, in the optical system for forming an image, the optical unit housing section configured to house the optical unit such as an imaging device is at least supported to maintain durability of a place including an optical function in the entire apparatus. In this case, the frame is arranged on the side closer to the nose of the observer than the optical unit housing section and reduced in size. Therefore, it is possible to give an impression that the entire apparatus is small in size in appearance. Further, it is possible to attain a reduction in the weight of the entire apparatus through a reduction in the size of the frame. Compared with a structure in which the entire apparatus is covered with a case-like member, the apparatus can be formed in a shape closer to the form of the eyeglasses by the configuration of the frame or the like. It is possible to attain design with apparent voluminousness suppressed.

In a specific aspect of the invention, a step is provided between the frame and the optical unit housing section. In this case, it is possible to vary an external appearance using the step and suppress apparent voluminousness.

In another aspect of the invention, the frame supports the optical unit housing section in a drooping state to form the step. In this case, it is possible to form a stair-like step expanding to the outer side from the frame located on the upper side toward the optical unit housing section located on the lower side. It is possible to vary an external shape.

In still another aspect of the invention, contrast is provided concerning colors between the frame and the optical unit housing section. In this case, it is possible to vary an external shape with contrast of colors and suppress apparent voluminousness.

In yet another aspect of the invention, the frame relatively has an expansive color and the optical unit housing section may relatively have a reductive color. In this case, the optical unit housing section that tends to project in the lateral direction in which the eyes range is shown relatively small. Consequently, it is possible to give an impression as if the entire virtual image display apparatus is small in size.

In still yet another aspect of the invention, the optical unit housing section is arranged on the side head side of the observer when the virtual image display apparatus is worn, and the frame extends, on the upper head side of the observer, from the eye front portion to the side head side of the observer along the lateral direction in which the eyes of the observer range and supports the optical unit housing section and the light guide device from the upper head side. In this case, while arranging the optical unit housing section on the side head side and forming the eyeglass-type shape as the configuration of the entire virtual image display apparatus, it is possible to surely support the optical system with the frame arranged on the upper head side and secure durability.

In further another aspect of the invention, the virtual image display apparatus further includes, as a part of the optical unit, a projection lens configured to project light emitted from the video device to the light guide device, the optical unit housing section houses, on the inside thereof, a lens barrel configured to support an optical device configuring the projection lens, and the lens barrel is supported by the frame. In this case, it is possible to surely support the projection lens, which is a part of the optical unit, with the frame and fix the projection lens while housing and protecting the projection lens with the optical unit housing section.

In still further another aspect of the invention, the lens barrel includes an engaging member for coupling the lens barrel to the light guide device, and the light guide device includes an attaching section for attaching the light guide device to the frame. In this case, it is possible to directly fix the lens barrel configured to house the optical device configuring the projection lens to the light guide device and directly fix the light guide device to the frame. That is, it is possible to surely integrally assemble the projection lens, the light guide device and the flame.

In yet further another aspect of the invention, the optical unit housing section houses the video device in a state in which a region of clearance is given to the video device. In this case, it is possible to keep a state in which the video device is not directly affected by a shock from the outside. An aligned state of the video device is maintained. It is possible to maintain durability of image formation against the shock from the outside.

In still yet further another aspect of the invention, the frame includes an aluminum frame portion. In this case, it is possible to maintain sufficient rigidity and secure durability of the entire apparatus while reducing the frame in size and weight.

In a further aspect of the invention, the frame includes the aluminum frame portion and a resin section assembled to the aluminum frame portion to be dividable from the aluminum frame portion. In this case, in the frame, a portion not required to have high rigidity is configured by the resin section. Since the resin section is dividable, it is possible to improve workability in incorporating a harness or the like for a camera or the like.

In a still further aspect of the invention, the light guide device includes a light guide member configured to guide light of a video and enable see-through of external light and a light transmitting member coupled to the light guide member and configured to supplement a see-through function for the external light. In this case, it is possible to realize, with the integrated light guide member and light transmitting member, a state of see-through in which the external light and the video light are superimposed.

BRIEF DESCRIPTION OF THE DRAWINGS

The invention will be described with reference to the accompanying drawings, wherein like numbers reference like devices.

FIG. 2A is an external perspective view of the virtual image display apparatus.

FIG. 2B is a perspective view showing the internal structure of the virtual image display apparatus excluding a frame and an armor member.

FIG. 6A is a plan view showing a state of an external appearance of the virtual image display apparatus.

FIG. 6B is a front view showing the state of the external appearance of the virtual image display apparatus.

DESCRIPTION OF EXEMPLARY EMBODIMENTS

A virtual image display apparatus according to an embodiment of the invention is explained in detail below with reference to FIG. 1 and the like.

Figure 1:
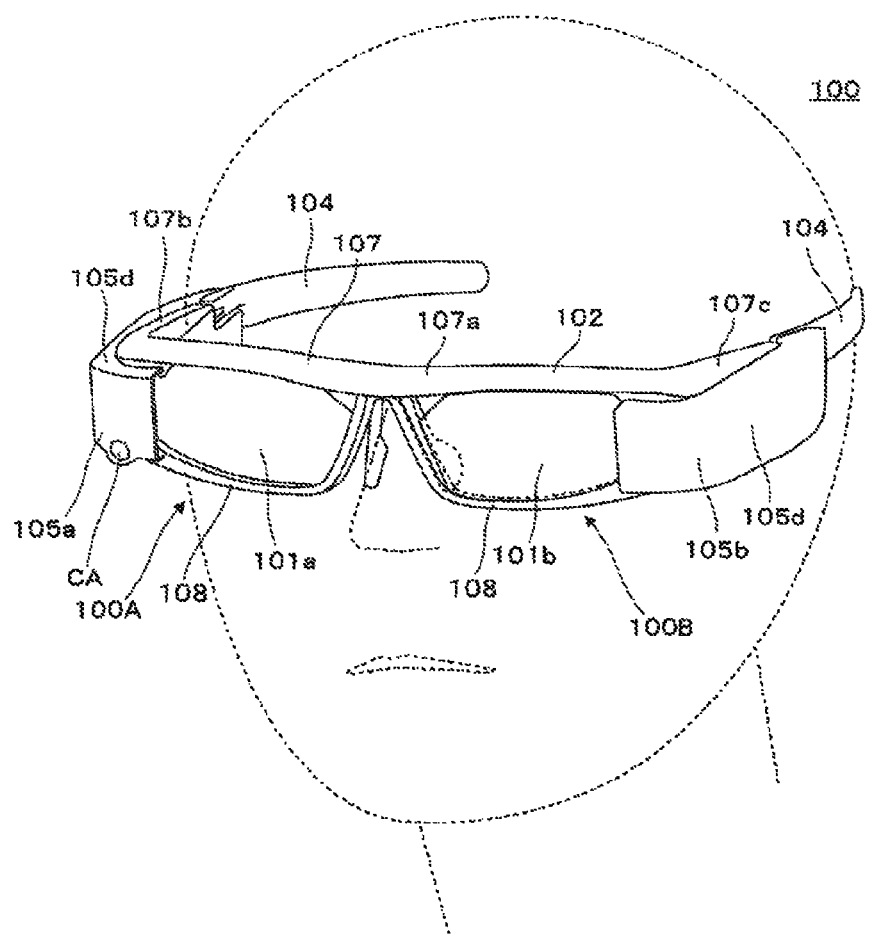
FIG. 1 is a perspective view for simply explaining the external appearance of a virtual image display apparatus in an embodiment of the invention.

As shown in FIG. 1, a virtual image display apparatus 100 in this embodiment is a head mounted display having an external appearance like eyeglasses. The virtual image display apparatus 100 can cause an observer or a user wearing the virtual image display apparatus 100 to visually recognize image light formed by a virtual image and can cause the observer to visually recognize or observe an external image by see-through. The virtual image display apparatus 100 includes first and second optical members 101a and 101b configured to cover the front of the observer to be seen through, a frame section 102 configured to support the optical members 101a and 101b, and first and second image forming main body sections 105a and 105b added to portions from left and right ends of the frame section 102 to temple portions (temples) 104 in the back. A first display apparatus 100A formed by combining the first optical member 101a and the first image forming main body section 105a on the left side on the figure is a portion for forming a virtual image for the right eye and independently functions as a virtual image display apparatus. A second display apparatus 100B formed by combining the second optical member 101b and the second image forming main body section 105b on the right side on the figure is a portion for forming a virtual image for the left eye and independently functions as a virtual image display apparatus. The virtual image display apparatus 100 includes, in a side portion of the first display apparatus 100A, a small camera CA capable of performing an imaging operation.

FIG. 2A is a perspective view for explaining the external appearance on the front side of the virtual image display apparatus 100. FIG. 2B is a partially exploded perspective view on the front side of the virtual image display apparatus 100.

As shown in the figures, the frame section 102 provided in the virtual image display apparatus 100 includes a frame 107 arranged on the upper side and a protector 108 arranged on the lower side. In the frame section 102, the frame 107 on the upper side shown in FIG. 2A is an elongated tabular member bent in a U shape in an XZ plane. The frame 107 includes a front surface section 107a extending in the left right lateral direction (an X direction) and a pair of side surface sections 107b and 107c extending in a front back depth direction (a Z direction). The frame 107, that is, the front surface section 107a and the side surface sections 107b and 107c are configured to mainly include a portion of metal (an aluminum frame portion) formed of aluminum die cast or other various metal materials. Since the frame 107 includes the aluminum frame portion, it is possible to maintain sufficient rigidity and secure durability of the entire apparatus while reducing the frame 107 in size and weight. The frame 107 may include a disassemblable resin portion in a part thereof. If a disassemblable section is provided in the frame 107, it is possible to improve workability in incorporating a harness or the like for a camera CA or the like. The width in the depth direction (the Z direction) of the front surface section 107a is sufficiently larger than the thickness or the width of the light guide device 20 corresponding to the first and second optical members 101a and 101b. On the left side of the frame 107, specifically, in a side end portion 65a, which is a portion from the left end portion in the front surface section 107a to the side surface section 107b, the first optical member 101a and the first image forming main body section 105a are aligned and directly fixed by screwing to be supported. On the right side of the frame 107, specifically, in a side end portion 65b, which is a portion from the right end portion in the front surface section 107a to the side surface section 107c, the second optical member 101b and the second image forming main body section 105b are aligned and directly fixed by screwing to be supported. The first optical member 101a and the first image forming main body section 105a are aligned with each other by fitting. The second optical member 101b and the second image forming main body section 105b are aligned with each other by fitting. The first and second image forming main body sections 105a and 105b configuring the optical system unit are covered with a cover-like armor member 105d. In other words, the armor member 105d functions as an optical unit housing section OS configured to house and protect the first and second image forming main body sections 105a and 105b configuring the optical unit.

The protector 108 shown in FIGS. 2A and 2B is an under rim-like member and arranged and fixed under the frame 107 shown in FIG. 2A. A center section 108g of the protector 108 is fixed to a center section 107g of the frame 107 by fitting and screwing. The protector 108 is an elongated tabular member bent in a two-stage crank shape and integrally formed of a metal material or a resin material. A first distal end portion 108i of the protector 108 is fixed in a state in which the first distal end portion 108i is fit in a recess 105i provided in an outer member 105e of the armor member 105d configured to cover the first image forming main body section 105a. A second distal end portion 108j of the protector 108 is fixed in a state in which the second distal end portion 108j is fit in a recess 105j provided in an outer member 105e of the cover-like armor member 105d configured to cover the second image forming main body section 105b.

The frame 107 supports the first and second image forming main body sections 105a and 105b and the armor member 105d (an optical unit housing section OS) configured to cover the first and second image forming main body sections 105a and 105b. The frame 107 also has a role of protecting the insides of the first and second image forming main body sections 105a and 105b in cooperation with the armor member 105d. The frame 107 and the protector 108 are separated from or loosely in contact with an elliptical circumferential portion of the light guide device 20 excluding a base side coupled to the first and second image forming main body sections 105a and 105b. Therefore, even if there is a difference in a coefficient of thermal expansion between the light guide device 20 in the center and the frame section 102 including the frame 107 and the protector 108, expansion of the light guide device 20 in the frame section 102 is allowed. It is possible to prevent distortion, deformation, and damage from occurring in the light guide device 20. When the frame 107 supports an object (e.g., the optical unit housing section OS), this not only means that the optical unit housing section OS or the like is directly assembled to the frame 107 to maintain a state in which the frame 107 fixes the optical unit housing section OS or the like but also means that the optical unit housing section OS is indirectly supported via another member.

A nose receiving section 40 is provided incidental to the frame 107. The nose receiving section 40 has a role of supporting the frame section 102 by coming into contact with the nose of the observer. That is, the frame section 102 is arranged in front of the face of the observer by the nose receiving section 40 supported by the nose and the pair of temple sections 104 supported by the ears. The nose receiving section 40 is fixed by screwing in the center section 107g of the front section 107a of one frame 107 configuring the frame section 102 to be held in the center section 108g of the other protector 108 configuring the frame section 102.

With the configuration explained above, the optical unit housing section OS is arranged on the side head side of the observer when the virtual image display apparatus 100 is worn. The frame 107 extends, on the upper head side of the observer, from the eye front portion to the side head side of the observer along the lateral direction in which the eyes of the observer range and supports the optical unit housing section OS and the light guide device 20 from the upper head side.

When the virtual image display apparatus 100 has a configuration in which the optical unit housing section OS (the armor member 105d) housing the optical unit is arranged in the side head of the observer, since large devices are present around the side head, compared with the eyeglasses, protrusions are extremely conspicuous when the virtual image display apparatus 100 is worn. The appearance of the virtual image display apparatus 100 tends to be deteriorated. On the other hand, in the virtual image display apparatus 100 in this embodiment, for example, the frame 107 is arranged in the side closer to the nose of the observer than the optical unit housing section OS to form the external appearance of the apparatus in a shape closer to the form of the eyeglasses. Apparent voluminousness is suppressed to realize design that gives a neat impression.

Figure 3A:
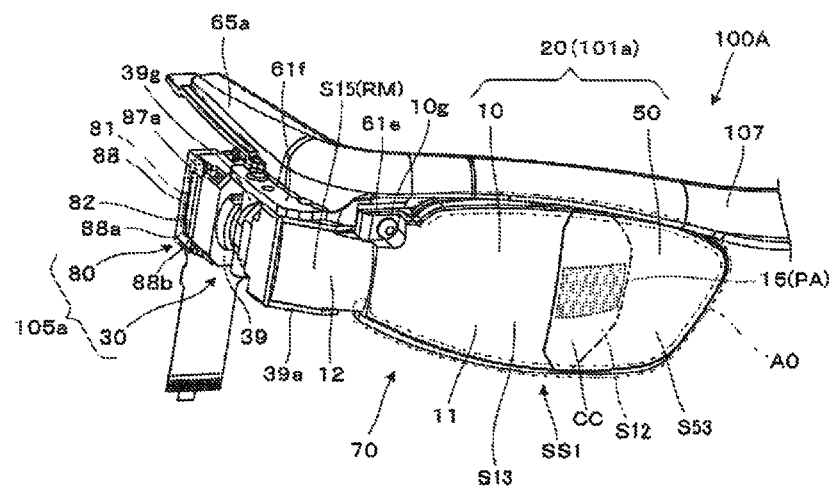
FIG. 3A is a perspective view showing a state in which the armor member and the like are removed to explain the structure of a first display apparatus in the virtual image display apparatus.

The configuration of the optical system of the virtual image display apparatus 100 is explained below. First, as shown in FIG. 3A, the first display apparatus 100A can be seen as including a projection see-through device 70, which is an optical system for projection, and an image display device 80 configured to form video light. The projection see-through device 70 has a role of projecting an image formed by the first image forming main body section 105a to the eyes of the observer as a virtual image. The projection transmitting device 70 includes a light guide member 10 for light guide and see-through, a light transmitting member 50 for see-through, and a projection lens 30 for imaging. That is, the first optical member 101a or the light guide device 20 is configured by the light guide member 10 and the light transmitting member 50. The first image forming main body section 105a is configured by the image display device 80 and the projection lens 30.

Figure 3B:
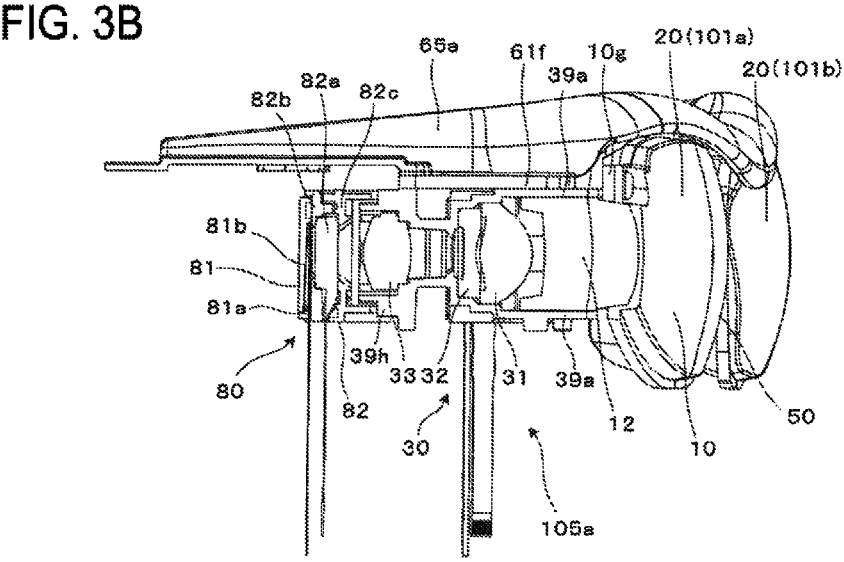
FIG. 3B is a side sectional view for explaining the structures of an image display device and a projection lens incorporated in the first display apparatus.
Figure 4:
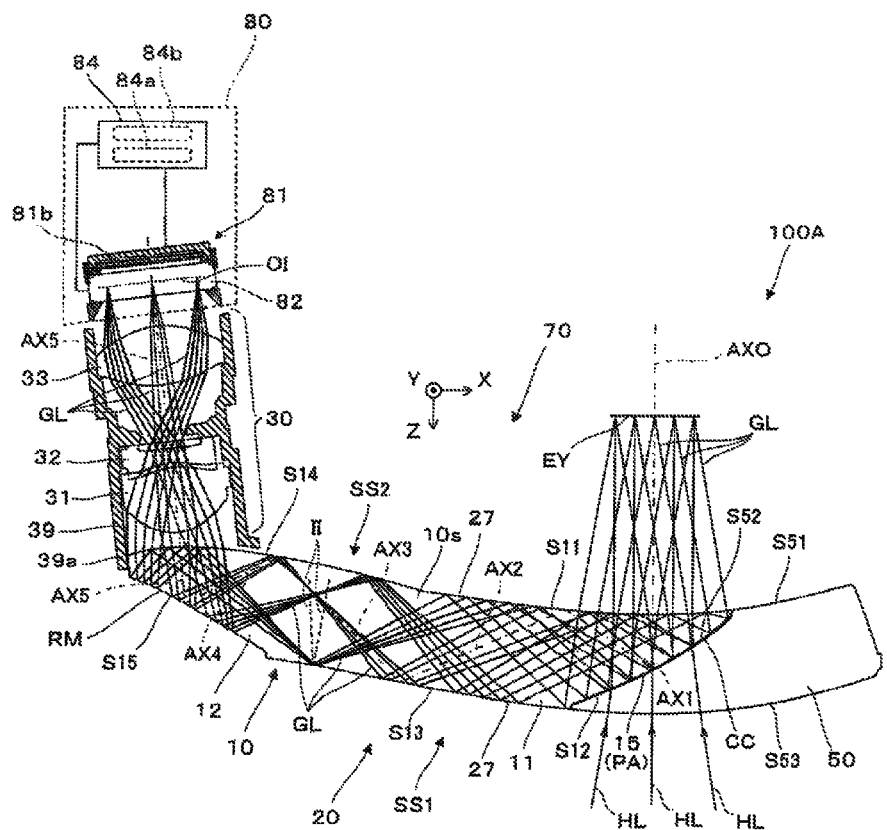
FIG. 4 is a sectional view in a vertically symmetrical surface of the first display apparatus configuring the virtual image display apparatus.

The image display device 80 and the projection lens 30 configuring the first image forming main body section 105a are explained with reference to FIG. 3B, FIG. 4, and the like.

The image display device 80 includes a lighting device 81 configured to emit illumination light, a video display device 82, which is a transmissive space light modulating device, and a driving control section 84 configured to control the operations of the lighting device 81 and the video display device 82.

The lighting device 81 of the image display device 80 includes a light source 81a configured to generate light including three colors of red, green, and blue and a backlight guide section 81b configured to diffuse light from the light source 81a and change the light to a light beam having a rectangular section. The video display device 82 is formed by, for example, a liquid crystal display device and spatially modulates illumination light emitted from the lighting device 81 and forms image light, which should be a display target such as a moving image. The driving control section 84 includes a light source driving circuit 84a and a liquid crystal driving circuit 84b. The light source driving circuit 84a supplies electric power to the lighting device 81 and causes the lighting device 811 to emit illumination light having stable luminance. The liquid crystal driving circuit 84b outputs an image signal or a driving signal to the video display device 82 to thereby form color video light or image light, which is a base of a moving image or a still image, as a transmissivity pattern. An image processing function can be imparted to the liquid crystal driving circuit 84b. However, the image processing function can also be imparted to an external control circuit.

The projection lens 30 is a projection optical system including three optical devices 31 to 33 as components. The projection lens 30 includes a lens barrel 39 configured to house and support the optical devices 31 to 33. The optical devices 31 to 33 are, for example, aspherical lenses. The optical devices 31 to 33 cooperate with a part of the light guide member 10 to form an intermediate image corresponding to a display image of the video display device 82 on the inside of the light guide member 10. The lens barrel 39 includes a rectangular frame-like engaging member 39a on the front end side. The engaging member 39a fits with a distal end portion on the second light guide portion 12 side of the light guide member 10 to enable positioning of the light guide member 10 with respect to the lens barrel 39.

The video display device 82 is housed in the inside of a housing-like device case 88 and retained not to move. The device case 88 includes a first supporting portion 88a configured to support a first substrate 82a of the video display device 82 through fitting and a second supporting portion 88b configured to cover a second substrate 82b of the video display device 82. The supporting portions 88a and 88b are molded products formed of a light-blocking resin material.

Figure 5:
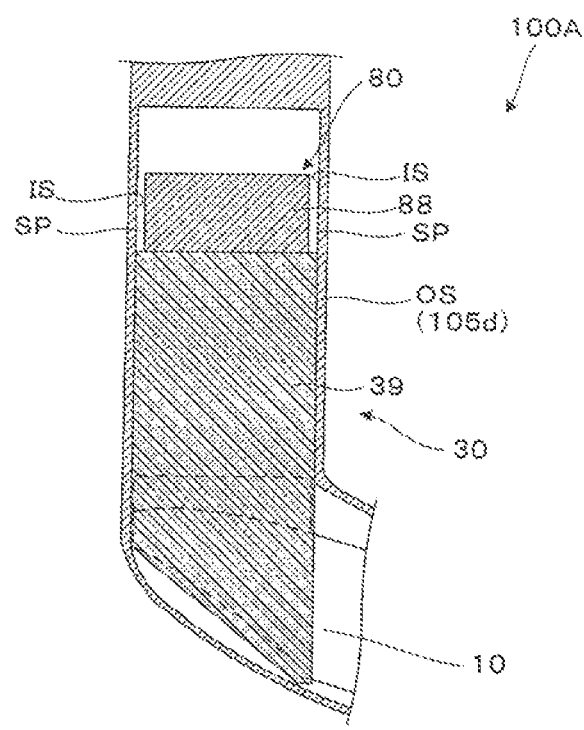
FIG. 5 is a diagram schematically showing a state of an optical unit housing section in the virtual image display apparatus.

As explained above, in the virtual image display apparatus 100, the video display device 82 and the projection lens 30 are optical units for forming and projecting an image (equivalent to the image forming main body sections 105a and 105b shown in FIG. 2B and the like). Further, as schematically shown in FIG. 5, the device case 88 configured to house the video display device 82 (see FIG. 3A and the like) and the lens barrel 39 housing the optical devices 31 to 33 (see FIG. 3B and the like) configuring the projection lens 30 are supported, housed, and protected by the optical unit housing section OS. As shown in the figure, the device case 88 is housed in a state in which the device case 88 has a region SE of clearance with respect to an inner wall surface IS of the optical unit housing section OS. Consequently, the video display device 82 in the device case 88 is kept in a state in which the video display device 82 is not directly affected by a shock from the outside.

Characteristics of an external shape of the virtual image display apparatus 100 are explained below with reference to FIGS. 6A and 6B. FIG. 6A is a plan view showing a state of an external appearance of the virtual image display apparatus 100. FIG. 6B is a front view showing the state of the external appearance of the virtual image display apparatus 100. FIGS. 6A and 6B schematically show the external appearance. A part of members are not shown in the figures or simplified.

As shown in the figure, in the virtual image display apparatus 100, an edge on the peripheral side of the frame 107 is represented as outer edge 107e. An edge on the peripheral side of the optical unit housing section OS is represented as outer edge OSe. The outer edge 107e of the frame 107 is arranged on a side closer to a position where the nose of the observer should be arranged in the lateral direction in which the eyes of the observer range compared with the outer edge OSe of the optical unit housing section OS.

The outer edge 107e of the frame 107 is arranged on the side closer to the nose of the observer in the lateral direction in which the eyes of the observer range than the outer edge OSe of the optical unit housing section OS. This is defined as explained below. First, as shown in FIG. 6B, an axis present on the center side in the lateral direction in which the eyes of the observer range, extending in the longitudinal direction perpendicular to the lateral direction, and serving as a reference indicating the position where the nose of the observer is present is represented as center axis AA. The position of an outer edge end portion most distant from the center axis AA in the outer edge 107e of the frame 107 is represented as first position FT1. The position of an outer edge end portion most distant from the center axis AA in the outer edge OSe of the optical unit housing section OS is represented as second position FT2. In this case, when the first position FT1 and the second position FT2 are compared, if the first position FT1 is a position closer to the nose of the observer, that is, closer to the center axis AA than the second position FT2, the outer edge 107e is arranged on a side closer to the position of the nose of the observer in the lateral direction in which the eyes of the observer range than the outer edge OSe. As shown in the figures, when the virtual image display apparatus 100 is a binocular vision type of a pair of left and right eyes, the frame 107 is relatively closer to the center in the lateral direction in which the eyes of the observer range. In other words, compared with the frame 107, the optical unit housing section OS has a portion projecting to the outer side.

In the case shown in the figures, the frame 107 supports the optical unit housing section OS in a drooping state. The outer edge 107e of the frame 107 is arranged on a side closer to the position of the nose of the observer in the lateral direction in which the eyes of the observer range than the outer edge OSe of the optical unit housing section OS. The outer edge 107e is reduced in size. As a result, for example, as shown in FIG. 6B, a step ST is provided between the frame 107 and the optical unit housing section OS. Further, in the case shown in the figure, the frame 107 is painted in a relatively bright expansive color and, on the other hand, the optical unit housing section OS is painted in a relatively dark reductive color to provide contrast concerning colors between the frame 107 and the optical unit housing section OS. Consequently, it is possible to vary an external shape, show the optical unit housing section OS, which tends to project in the lateral direction, relatively small, and give an impression as if the entire virtual image display apparatus 100 is small in size.

When the virtual image display apparatus 100 has the structure explained above, it is possible to form the virtual image display apparatus 100 in a shape closer to the form of the eyeglasses compared with, for example, a structure in which the entire optical system including not only the optical unit such as the projection lens 30 but also the light guide device 20 is covered with a case-like member instead of the frame 107. Since the virtual image display apparatus 100 has a skeleton-like structure in which the frame 107 is provided on the inside without a member for covering the entire apparatus from the outer side, it is possible to realize design with apparent voluminousness suppressed.

Consequently, in the virtual image display apparatus 100, the external appearance of the entire apparatus is formed in a shape closer to the form of the eyeglasses and gives a neat impression when viewed from the outside.

The configurations of the other portions and the like are explained below. First, the configuration of the light guide device 20 is explained with reference to FIGS. 7A and 7B. A state in which the sections such as the light guide device 20 and the lens barrel 39 configuring the first display apparatus 100A are assembled to the frame 107 is explained with reference to FIGS. 8A and 8B.

Figure 7A:
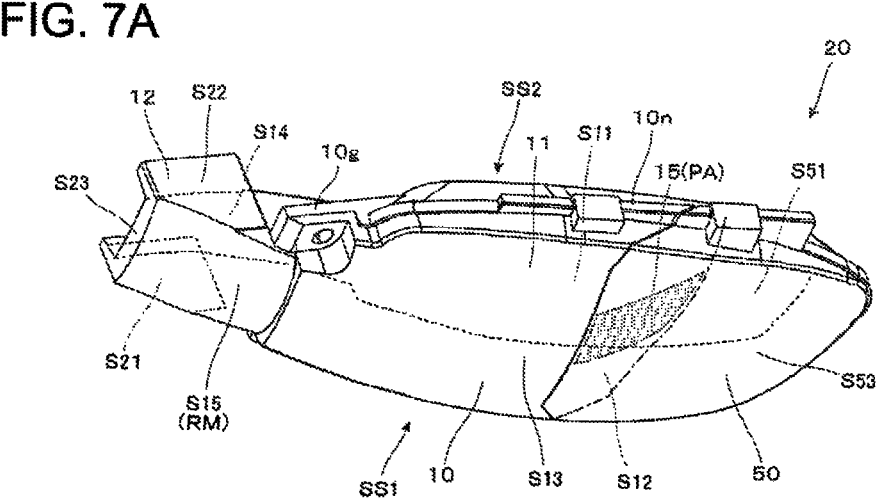
FIGS. 7A and 7B are perspective views for explaining an external appearance of a light guide device or an optical member incorporated in the first display apparatus.
Figure 7B:
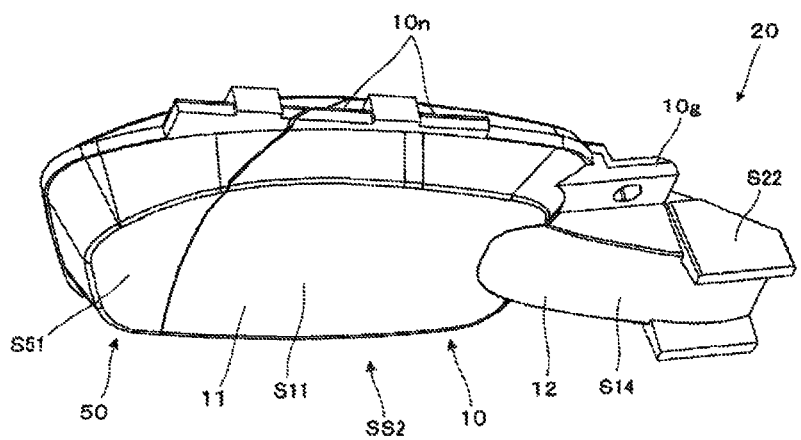

As shown in FIGS. 7A and 7B, the light guide member 10 and the light transmitting member 50 are fixed to each other to configure the integral light guide device 20. The light guide device 20 is a light transmissive optical block-like or prism-like member configured to guide light of a video to the eyes of the observer while reflecting the video light on the inside. A main body portion surrounded by a peripheral portion in the light guide device 20 has an elliptical contour. The light transmitting member 50 is arranged in an extending direction of the first light guide portion 11 to be coupled to the first light guide portion 11 on the distal end side, that is, the emission side or the light emission side of the light guide portion 10. The light transmitting member 50 is fixed to the first light guide portion 11 by joining using an adhesive. The light guide device 20 obtained by combining the light guide member 10 and the light transmitting member 50 is equivalent to the first optical member 101a shown in FIG. 1. The projection lens (the projection optical system) 30 of the projection see-through device 70 and the image display device 80 configured to form an image pattern for display are equivalent to the first image forming main body section 105a shown in FIG. 1. In a peripheral portion of the light guide device (the optical member) 20, a rib 10n to be fit in a limiting section 107n (see FIG. 8B) provided on the lower surface of the frame 107 is formed on an upper side close to the frame 107. Displacement in the depth direction (the Z direction) of the light guide device 20 is limited by the presence of the first rib 10n.

Figure 8A:
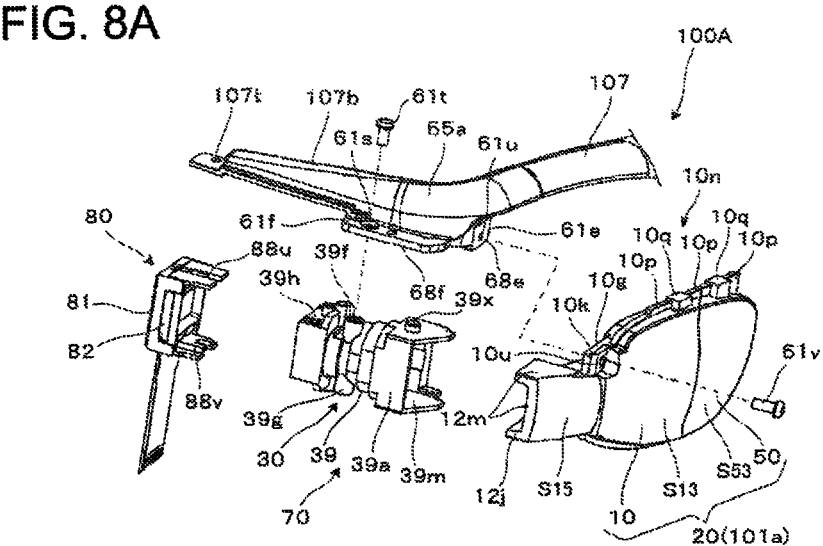
FIGS. 8A and 8B are exploded perspective views for explaining a method of fixing a light guide member and a projection lens in the virtual image display apparatus to a frame.
Figure 8B:
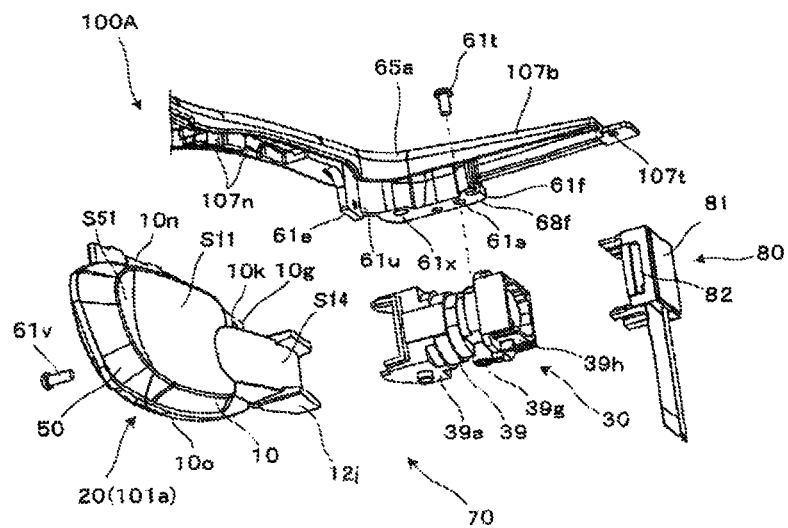

Assembly of the first display apparatus 100A to the frame 107 is explained below with reference to FIGS. 8A and 8B and the like. The video display device 82 of the image display device 80 configuring the first image forming main body section 105a is fixed to a rear end portion 39h of the lens barrel 39 of the projection lens 30 using protrusion members (fitting sections) 88u and 88v. When the video display device 82 is fixed to the lens barrel 89, the video display device 82 is slightly displaced in a direction perpendicular to an optical axis to perform alignment or position adjustment with respect to the lens barrel 39. The thin plate-like lighting device 81 is attached to the rear surface (on the opposite side to the projection lens 30) of the video display device 82 in advance. The projection lens 30 is directly fixed to a first fixing section 61f provided in the side end portion 65a of the frame 107 using an attaching section 39g formed to be embedded in the lens barrel 39. In the fixing, a rear surface 66f of the first fixing section 61f and an upper end face or the like of the attaching section 39q come into contact with each other and alignment is attained. A screw 61t is screwed into the attaching section 39g via a screw hole 61s, whereby detachable and sure fixing can be performed. In this case, a boss 39x provided in the lens barrel 39 is fit in a boss hole 61x of the frame 107, rotation of the lens barrel 39 is regulated, and positioning concerning rotation is also performed. On the other hand, the light guide device 20, which is the first optical member 101a, is directly fixed to a second fixing section 61e provided at the side end portion 65a of the frame 107 using a protrusion-like attaching section 10g formed in a neck section of the light guide device 20. The attaching section 10g is vertically provided to expand to the periphery in a portion on the incident side or the light incident side of the light guide device 20, specifically, around a boundary between the first light guide portion 11 and the second light guide portion 12. In the fixing, an abutting surface 68e provided in a front side portion of the second fixing section 61e and a rear surface 10k of the attaching section 10g come into contact with each other and alignment is attained. A screw 61v is screwed into a screw hole 10u via a screw hole 61u, whereby detachable and sure fixing can be performed.

A distal end portion 12j on the second light guide portion 12 side of the light guide member 10 is fit in a rectangular frame-Like engaging member 39a provided and opened on the front end side of the lens barrel 39 of the projection lens 30, whereby the light guide device 20 is locked in a state in which the light guide device 20 is positioned with respect to the projection lens 30. That is, when the light guide member 10 provided in the light guide device 20 is fixed to the second fixing section 61e of the frame 107, the distal end portion 12j on the second light guide portion 12 side is inserted to be fit in the engaging member 39a of the lens barrel 39. In this case, a side surface 12m of the distal end portion 12j comes into contact with an inner surface 39m of the engaging member 39a and alignment is attained. Thereafter, although detailed explanation is omitted, the protector 108 is fixed to the frame 107 to hold the nose receiving section 40 in the center portion 107g. According to the process explained above, an assembly of the frame 107, the projection see-through device 70, and the protector 108 can be obtained.

Thereafter, as shown in FIG. 2A, the outer member 105e of the armor member 105d is fixed to the assembly of the frame 107 and the projection see-through device 70. The outer member 105e is fixed by fitting with the frame 107 and the projection lens 30, screw fastening to the attaching section 39g of the projection lens 107, or the like. In this case, the outer member 105e is fixed by fitting the distal end portions 108i and 108j of the protector 108, which is already fixed to the frame 107, in the recess 105i formed in the outer member 105e. Subsequently, the inner member 105f is fit in the outer member 105e and fixed to the outer member 105e by screwing. Consequently, the base side of the light guide device 20 and the projection lens 30 configuring the projection see-through device, the image display device 80, and a part of the side surface sections 107b and 107c of the frame 107 are housed in a space between the inner member 105f and the outer member 105e. When the virtual image display apparatus 100 is assembled as explained above, the virtual image display apparatus 100 can be set in a state in which the optical unit housing section OS housing the projection lens 30 and the like is arranged on the side head side of the observer when the virtual image display apparatus 100 is worn, the frame 107 extends from the eye front portion to the side head side of the observer along the lateral direction in which the eyes of the observer range on the upper head side of the observer and supports the optical unit housing section OS and the light guide device 20 from the upper head side.

The temple sections 104 are fixed to the distal ends of a pair of side surface sections 107b and 107c provided in the frame 107. Coupling sections of the temple section 104 and the side surface sections 107b and 107c can have hinge structures. In this case, the temple section 104 can be folded.

The second display apparatus 100B shown in FIG. 1 has the same structure as the first display apparatus 100A and is obtained by simply symmetrically reversing the first display apparatus 100A. Therefore, explanation concerning the structure, the function, the assembly, and the like of the second display apparatus 100B is omitted.

Details of the functions, the operations, and the like of the projection see-through device 70 and the like are explained with reference to FIG. 4. In the projection see-through device 70, the light guide member 10, which is a part of the light guide device 20, is an arcuate member bent along the face surface in plan view. In the light guide member 10, the first light guide portion 11 is arranged on a center side, that is, a light emission side close to the nose. As side surfaces having an optical function, the first light guide portion 11 includes a first surface S11, a second surface S12, and a third surface S13. The second light guide portion 12 is arranged on a peripheral side, that is, a light incident side apart from the nose. As side surfaces having an optical function, the second light guide portion 12 includes a fourth surface S14 and a fifth surface S15. Among the surfaces, the first surface S11 and the fourth surface S14 are continuously adjacent to each other. The third surface S13 and the fifth surface S15 are continuously adjacent to each other. The second surface S12 is arranged between the first surface S11 and the third surface S13. The fourth surface S14 and the fifth surface S15 are adjacent to each other at a large angle.

In the light guide member 10, the first surface S11 is a free curved surface having an emission side optical axis AXO parallel to the Z axis as a center axis. The second surface S12 is a free curved surface having an optical axis AX1, which is included in a reference plane (a cross section shown in the figure) parallel to the XZ plane and inclines with respect to the Z axis, as a center axis. The third surface S13 is a free curved surface having the emission side optical axis AXO as a center axis. The fourth surface S14 is a free curved surface having an optical axis AX5 parallel to a bisector of a pair of optical axes AX3 and AX4, which are included in the reference plane parallel to the XZ plane and incline with respect to the Z axis, as a center axis. The fifth surface S15 is a free curved surface having a bisector of a pair of optical axes AX4 and AX5, which are included in the reference plane parallel to the XZ plane and incline with respect to the Z axis, or a line forming a small angle with the bisector as a center axis. The first to fifth surfaces S11 to S15 have a symmetrical shape in a perpendicular (or longitudinal) Y axis direction across the reference plane (the cross section shown in the figure) that extends horizontally (or laterally) and is parallel to the XZ plane and through which the optical axes AX1 to AX5 and the like pass.

A main body 10s of the light guide member 10 is formed of a resin material showing high light transmissivity in a visible range. The main body 10s is formed by, for example, injecting thermoplastic resin into a mold and solidifying the thermoplastic resin. As the material of the main body 10s, for example, cycloolefin polymer can be used. The main body 10s is an integral molded product. However, the light guide member 10 can be functionally divided into the first light guide portion 11 and the second light guide portion 12 as explained above. The first light guide portion 11 enables wave guide and emission of video light GL and enables transmission of the external light HL. The second light guide portion 12 enables incidence and wave guide of the video light GL.

In the first light guide portion 11, the first surface S11 functions as a refraction surface that emits the video light GL to the outside of the first light guide portion 11 and functions as a total reflection surface that totally reflects the video light GL on the inner surface side. The first surface S11 is arranged in front of an eye EY and is formed in a concave surface shape with respect to the observer. The first surface S11 is a surface formed by a hard coat layer 27 applied to the surface of the main body 10s.

The second surface S12 is the surface of the main body 10s. A half mirror layer 15 is incidental to the surface. The half mirror layer 15 is a reflection film having light transmissivity (i.e., a semi-transmitting reflection film). The half mirror layer (the semi-transmitting reflection film) 15 is formed on a partial area PA where the second surface 12 is narrowed in the vertical direction along the Y axis rather than over the entire second surface S12 (see FIG. 7A). The half mirror layer 15 is formed by forming a metal reflection layer and a dielectric multilayer film on the partial area PA in a base surface of the main body 10s. The reflectance of the half mirror layer 15 to the video light GL is set to 10% or higher and 50% or lower in an assumed incident angle range of the video light GL from the viewpoint of facilitating observation of the external light HL by see-through. The reflective index of the half mirror layer 15 to the video light GL in a specific example is set to, for example, 20%. The transmittance of the half mirror layer 15 to the video light GL is set to, for example, 80%.

The third surface S13 functions as a total reflection surface that totally reflects the video light GL on the inner surface side. The third surface S13 is arranged in front of the eye EY. Like the first surface S11, the third surface S13 is formed in a concave surface shape with respect to the observer. When the external light HL is seen through the first surface S11 and the third surface S13, visibility is substantially zero. The third surface S13 is a surface formed by the hard coat layer 27 applied to the surface of the main body 10s.

In the second light guide portion 12, the fourth surface S14 functions as a total reflection surface that totally reflects the video light GL on the inner surface side. The fourth surface S14 also functions as a refractive surface that makes the video light GL incident in the second light guide portion 12. The fourth surface S14 is a surface formed by the hard coat layer 27 applied to the surface of the main body 10s.

In the second light guide portion 12, as explained above, the fifth surface S15 is formed by forming a light reflection film RM formed of an inorganic material on the surface of the main body 10s and functions as a reflection surface.

As explained above, the light transmitting member 50 is fixed integrally with the light guide member 10 to configure the one light guide device 20. The light transmitting member 50 is a member that supports a see-through function of the light guide member 10 (an auxiliary optical block). As side surfaces having an optical function, the light transmitting member 50 includes a first transmitting surface S51, a second transmitting surface S52, and a third transmitting surface S53. The second transmitting surface S52 is arranged between the first transmitting surface S51 and the third transmitting surface S53. The first transmitting surface S51 is present on a curved surface formed by extending the first surface S11 of the light guide member 10. The second transmitting surface S52 is a curved surface joined to and integrated with the second surface S12 by a bonding layer CC. The third transmitting surface S53 is present on a curved surface formed by extending the third surface S13 of the light guide member 10. Among the surfaces, the second transmitting surface S52 and the second surface S12 of the light guide member 10 are integrated by joining via the thin bonding layer CC. Therefore, the second transmitting surface S52 and the second surface S12 have shapes having substantially the same curvatures.

The light transmitting member (the auxiliary optical block) 50 shows high light transmissivity in the visible range. A main body portion of the light transmitting member 50 is formed of a thermoplastic resin material having a refractive index substantially the same as the refractive index of the main body 10s of the light guide member 10. The light transmitting member 50 is formed by joining the main body portion to the main body 10a of the light guide member 10 and then, in a joined state, forming a film together with the main body 10s using hard coat. That is, like the light guide member 10, the hard coat layer 27 is applied to the surface of the main body portion of the light transmitting member 50. The first transmitting surface S51 and the third transmitting surface S53 are surfaces formed by the hard coat layer 27 applied to the surface of the main body portion.

An optical path of the video light GL and the like in the virtual image display apparatus 100 is explained below. The video light GL emitted from the video display device (the video device) 82 is made incident on the fourth surface S14 having positive refractive power provided in the light guide member 10 while being focused by the projection lens 30.

The video light GL passed through the fourth surface S14 of the light guide member 10 travels while converging. When the video light GL passes through the second light guide portion 12, the video light GL is reflected on the fifth surface S15 having relatively weak refractive power, made incident on the fourth surface S14 again from the inner side, and reflected.

In the first light guide portion 11, the video light GL reflected on the fourth surface S14 of the second light guide portion 12 is made incident on the third surface S13 having relatively weak positive refractive power and totally reflected and made incident on the first surface S11 having relatively weak negative refractive power and totally reflected. The video light GL forms an intermediate image in the light guide member 10 before and after the video light GL passes through the third surface S13. An image surface II of the intermediate image corresponds to an image surface OI of the video display device 82.

The video light GL totally reflected on the first surface S11 is made incident on the second surface S12. In particular, the video light GL made incident on the half mirror layer 15 is partially reflected while being partially transmitted, made incident on the first surface S11 again, and passes through the first surface S11. The half mirror layer 15 acts as a layer having relatively strong positive refractive power with respect to the video light GL reflected on the surface. The first surface S11 acts as a surface having negative refractive power with respect to the video light GL that passes through the surface.

The video light GL passed through the first surface S11 is made incident on the pupil of the eye EY of the observer or a position equivalent to the pupil as a substantially parallel light beam. That is, the observer observers an image formed on the video display device (the video device) 82 by the video light GL serving as a virtual image.

On the other hand, in the external light HL, light made incident further on a −X side than the second surface S12 of the light guide member 10 passes through the third surface S13 and the first surface S11 of the first light guide portion 11. At this point, positive and negative refractive powers of the light are offset and aberration of the light is corrected. That is, the observer observes an external image with little distortion through the light guide member 10. Similarly, in the external light HL, light made incident further on a +X side than the second surface S12 of the light guide member 10, that is, light made incident on the light transmitting member 50 passes through the third transmitting surface S53 and the first surface S51 provided in the light transmitting member 50. At this point, positive and negative refractive powers of the light are offset and aberration of the light is corrected. That is, the observer observes an external image with little distortion through the light transmitting member 50. Further, in the external light HL, light made incident on the light transmitting member 50 corresponding to the second surface S12 of the light guide member 10 passes through the third transmitting surface S53 and the first surface S11. At this point, positive and negative refractive powers of the light are offset and aberration of the light is corrected. That is, the observer observes an external image with little distortion through the light transmitting member 50. Both of the second surface S12 of the light guide member 10 and the second transmitting surface S52 of the light transmitting member 50 have substantially the same curved surface shapes and have substantially the same refractive indexes. A gap between the surfaces is filled by the bonding layer CC having substantially the same refractive index. That is, the second surface S12 of the light guide member 10 and the second transmitting surface S52 of the light transmitting member 50 do not act as a refracting surface with respect to the external light HL.

However, the external light HL made incident on the half mirror layer 15 is partially reflected while being partially transmitted through the half mirror layer 15. Therefore, the external light HL from a direction corresponding to the half mirror layer 15 is weakened to the transmittance of the half mirror layer 15. On the other hand, the video light GL is made incident from a direction corresponding to the half mirror layer 15. Therefore, the observer observes an external image together with an image formed on the video display device (the video device) 82 in the direction of the half mirror layer 15.

In the video light GL propagated in the light guide member 10 and made incident on the second surface S12, light not reflected on the half mirror layer 15 is made incident in the light transmitting member 50. However, the light is prevented from returning to the light guide member 10 by a not-shown reflection preventing section provided in the light transmitting member 50. That is, the video light GL passed through the second surface S12 is prevented from being returned onto the optical path and changing to stray light. The external light HL made incident from the light transmitting member 50 side and reflected on the half mirror layer 15 is returned to the light transmitting member 50. However, the external light HL is prevented from being emitted to the light guide member 10 by the not-shown reflection preventing section provided in the light transmitting member 50. That is, the external light HL reflected on the half mirror layer 15 is prevented from being returned onto the optical path and changing to stray light.

As it is evident from the above explanation, with the virtual image display apparatus 100 in this embodiment, the optical unit housing section OS housing the video display device 82 and the projection lens 30 and the light guide device 20 are supported by the frame 107. Durability of the sections having the optical function in the entire apparatus is maintained. In this case, the frame 107 is arranged on the side closer to the nose of the observer than the optical unit housing section OS and reduced in size. Consequently, the virtual image display apparatus 100 can give an impression that the virtual image display apparatus 100 is small in size in appearance as a whole. Further, it is possible to attain a reduction in the weight of the entire virtual image forming apparatus 100 through the reduction in the size of the frame 107. Compared with a structure in which the entire apparatus is covered with a case-like member, the virtual image display apparatus 100 can be formed in a shape closer to the form of the eyeglasses by the configuration of the frame 107 or the like. It is possible to attain design with apparent voluminousness suppressed.

Figure 9A:
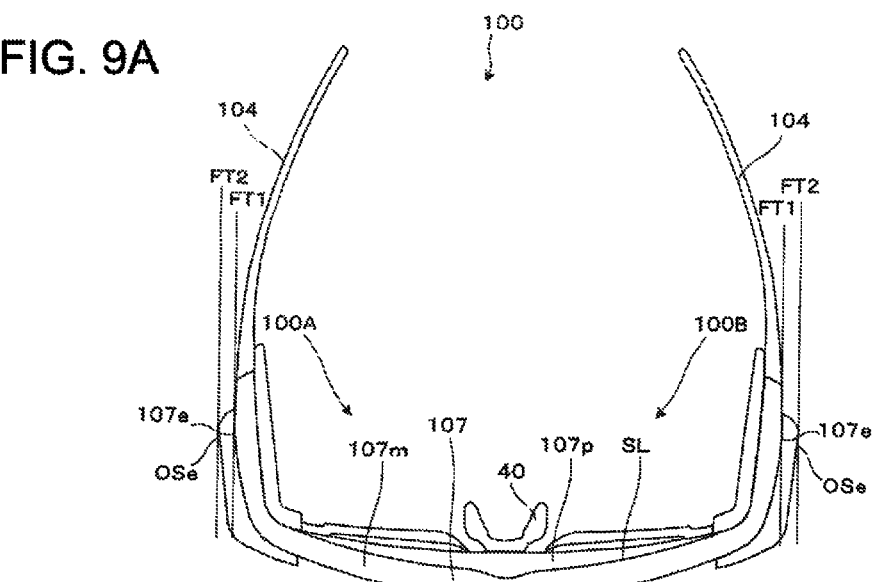
FIG. 9A is a plan view showing a state of an external appearance of a modification of the virtual image display apparatus.
Figure 9B:
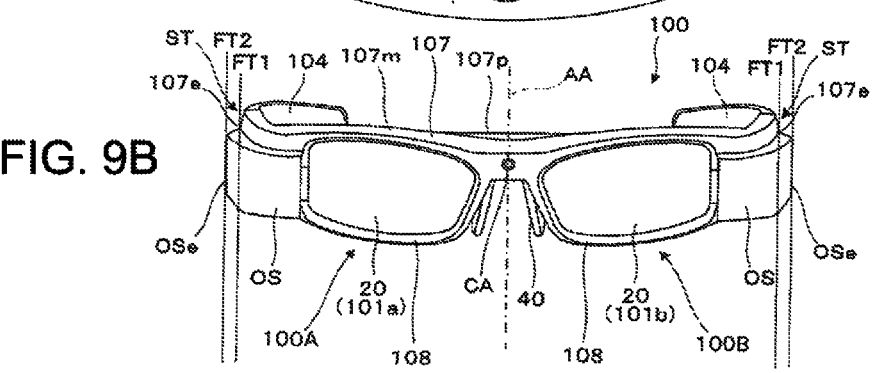
FIG. 9B is a front view showing the state of the external appearance of the modification of the virtual image display apparatus.

A modification of the virtual image display apparatus according to this embodiment is explained with reference to FIGS. 9A and 9B. FIGS. 9A and 9B correspond to FIGS. 6A and 6B. When compared with the virtual image display apparatus 100 shown in FIG. 1, FIGS. 6A and 6B, and the like, the virtual image display apparatus 100 shown in FIGS. 9A and 9B is the same except a part of the configuration such as the position of the camera CA and the shapes of the frame 107 and the protector 108. Therefore, detailed explanation of the sections of the virtual image display apparatus 100 is omitted.

As shown in FIGS. 9A and 9B, the frame 107 is configured to mainly include an aluminum frame portion 107*m* formed of aluminum die cast. The frame 107 includes a resin portion 107*p*, which is a disassemblable resin portion, in a part thereof. As shown in the figures, the resin portion 107*p* has a bar-like shape extending along the lateral direction in which the eyes of the observer range. A slit SL, which is a boundary portion separating the resin portion 107*p* and the aluminum frame portion 107*m*, is also formed to extend along the lateral direction in which the eyes of the observer range. In this case, a harness or the like for the camera CA arranged on the center side can be incorporated in a state in which the resin portion 107*p* and the aluminum frame portion 107*m* are disassembled (separated). Therefore, it is possible to improve assembly work for the camera CA. In the frame 107, a portion that particularly receives a load and requires rigidity is a portion bent in a direction in the temple sections 104 extend from the lateral direction in which the eyes range, that is, a portion equivalent to a so-called wraparound endpiece of the normal eyeglasses. In the figures, since the portion equivalent to the wraparound endpiece is formed by the aluminum frame portion 107*m*, sufficient strength is secured.

In frame 107, by painting the aluminum frame portion 107*m* and the resin portion 107*p* in different colors, it is possible to change an impression of an external appearance and realize design that gives a neat impression.

The invention is explained above according to the embodiment. However, the invention is not limited to the embodiment and can be carried out in various forms without departing from the spirit of the invention. For example, modifications explained below are also possible.

In the embodiment, in the image display device 80, the video display device 82 including the transmissive liquid crystal display device is used. However, the image display device 80 is not limited to the video display device 82 including the transmissive liquid crystal display device. Various image display devices can be used. For example, an image display device including a reflective liquid crystal display device is also possible. A digital micro mirror device or the like can be used instead of the video display device 82 including the liquid crystal display device. As the image display device 80, a self-emitting device represented by an LED array, an OLED (organic EL), and the like can be used.

The method of fixing the video display device 82 and the projection lens 30 is not limited to the method of fixing the video display device 82 and the projection lens 30 using the protrusion members (the fitting sections) 88*u* and 88*v*. Various methods of directly fixing the video display device 82 to the lens barrel 39 can be used.

The frame section 102 is not limited to the shape illustrated in the embodiment or the external appearance similar to the frame of the eyeglasses and can be formed in various shapes that can bridge the projection lens 30 and the light guide device 20.

In this embodiment, the frame 107 and the projection lens 30 are separate. The projection lens 30 is fixed to the frame 107 by screwing. However, the lens barrel 39 of the projection lens 30 can be molded integrally with the frame 107. As a method of integrally molding the lens barrel 39 and the frame 107, there are methods such as outsert molding and lens barrel section shaving after die cast integral molding.

The light guide device 20 or the projection lens 30 is not limited to the fastening by the screwing and can be fixed to the frame 107 by various methods.

In the embodiment, the engaging member 39a with the light guide device 20 is provided in the lens barrel 39 of the projection lens 30. However, an engaging member fitting with the lens barrel 39 can be provided to, for example, hold the lens barrel 39 on the light guide device 20 side.

In the embodiment, the half mirror layer (the semi-transmitting reflection film) 15 is formed in the laterally long rectangular region. However, the contour of the half mirror layer 15 can be changed as appropriate according to an application and the like. The transmittance and reflectance of the half mirror layer 15 can also be changed according to an application and the like.

In the embodiment, the half mirror layer 15 is the mere semi-transmissive film (e.g., the metal reflection film or the dielectric multilayer film). However, the half mirror layer 15 can be replaced with a hologram device having a flat surface or a curved surface.

In the embodiment, the distribution of the display luminance in the video display device 82 is not particularly adjusted. However, for example, when a luminance difference occurs depending on a position, the distribution of the display luminance can be unequally adjusted.

Figure 10A:
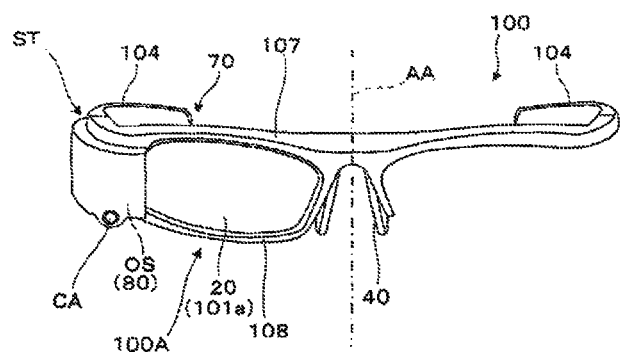
FIG. 10A is a front view showing a state of an external appearance of another example of the virtual image display apparatus.
Figure 10B:
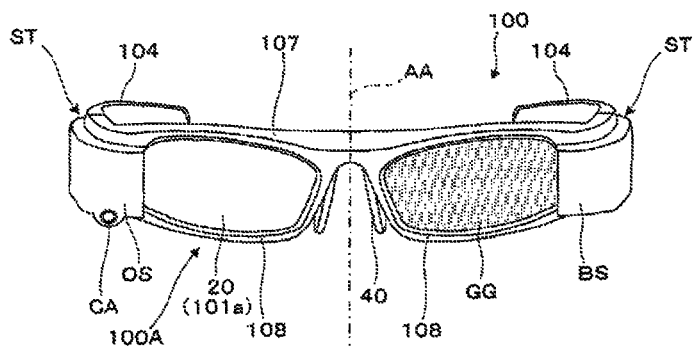
FIG. 10B is a front view showing a state of an external appearance of still another example of the virtual image display apparatus.

In the above explanation, the virtual image display apparatus 100 including the pair of display apparatuses 100A and 100B is explained. However, the virtual image display apparatus 100 can include a single display apparatus. That is, rather than providing one set of the projection see-through device 70 and the image display device 80 for each of the right and left eyes, the projection see-through device 70 and the image display device 80 may be provided for one of the right and left eyes to view an image with one eye. In this case, the frame 107 and the temple sections 104 can be arranged symmetrically as shown in FIG. 1 and the like. For example, as shown in FIG. 10A, when a device for image formation as the image display device 80 is provided only for the right eye, only the members for supporting the device such as the frame 107, the temple sections 104, and the nose receiving section 40 may be arranged on the left eye side not caused to visually recognize the image. When the image is viewed with one eye, for example, as shown in FIG. 10B, on the left eye side not caused to visually recognize the image, it is also possible that a light guide device is not provided and a transparent plastic lens GG is arranged before the eyes to form the virtual image display apparatus 100 in a symmetrical shape in appearance. In the figure, a box section BS on the left eye side is provided to keep external symmetry with the optical unit housing section OS on the right edge side and does not include an optical system on the inside. In this case, a member for keeping a balance in terms of the center of gravity may be housed on the inside of the box section BS.

In the embodiment, on the first surface S11 and the third surface S13 of the light guide member 10, video light is totally reflected by an interface with the air without applying a mirror, a half mirror, or the like on the surfaces. However, the total reflection in the virtual image display apparatus 100 according to the invention includes reflection performed by forming a mirror coat or a half mirror film on the entire first surface S11 or third surface S13 or a part of the first surface S11 or the third surface S13. For example, the total reflection also includes reflection of substantially all video light performed by applying a mirror coat or the like to the entire first surface S11 or third surface S13 or a part of the first surface S11 or the third surface S13 on condition that an incident angle of the video light satisfies all reflection conditions. If video light having sufficient brightness is obtained, the entire first surface S11 or third surface S13 or a part of the first surface S11 or the third surface S13 may be coated with a mirror having slight transmissivity.

In the above explanation, the light guide member 10 and the like extend in the lateral direction in which the eyes EY range. However, the light guide member 10 can be arranged to extend in the longitudinal direction. In this case, the light guide member 10 is supported by, for example, a cantilever state in an upper part.

The first surface S11 and the third surface S13 arranged to be opposed to each other are formed in the concave surface shape with respect to the observer. However, the first surface S11 and the third surface S13 may be formed in a parallel plane shape. In this case, visibility can be set to 0 when the observer views the outside world through the first surface S11 and the third surface S13. When the first surface S11 and the third surface S13 have the parallel plane shape, for example, the surfaces other than the first surface S11 and the third surface S13 may be formed as curved surfaces to form an intermediate image. Alternatively, the intermediate image does not have to be formed. In the configuration explained above, as in the embodiment, for example, by providing a step between the frame and the optical unit housing section, it is possible to vary an external appearance using the step and suppress apparent voluminousness.

The entire disclosure of Japanese Patent Application No. 2013-096767, filed May 2, 2013 is expressly incorporated by reference herein.

What is claimed is:

1. A virtual image display apparatus comprising:
a video device;
an optical unit housing section configured to house an optical unit including the video device;
a light guide device arranged in front of eyes of an observer and configured to direct light emitted from the optical unit including the video device to the eyes of the observer and cause the observer to visually recognize an image; and
a frame configured to support at least the optical unit housing section among components for image formation,
wherein an outer edge of the frame is arranged on a side closer to a position where a nose of the observer should be arranged than an outer edge of the optical unit housing section,
wherein a step is provided between the frame and the optical unit housing section, the frame supporting the optical unit housing section in a drooping state to form the step, the step being an expanding stair-like step,
wherein the light guide device is adjacent, in a lengthwise direction of the apparatus, to the optical unit housing section, and the light guide device is a fixed device,
wherein the frame includes a metal frame portion and a disassemblable resin portion assembled to the metal frame portion to be dividable from the metal frame portion, the apparatus further including a boundary portion that separates the resin portion from the metal frame portion, and the frame includes a camera incorporated therein, a harness for the camera being incorporable in a state where the resin portion and metal frame portion are disassembled.

2. The virtual image display apparatus according to claim 1, wherein contrast is provided concerning colors between the frame and the optical unit housing section.

3. The virtual image display apparatus according to claim 1, wherein the frame relatively has an expansive color and the optical unit housing section relatively has a reductive color.

4. The virtual image display apparatus according to claim 1, wherein
the optical unit housing section is arranged on a side head side of the observer when the virtual image display apparatus is worn, and
the frame extends, on an upper head side of the observer, from an eye front portion to the side head side of the observer along the lateral direction in which the eyes of the observer range and supports the optical unit housing section and the light guide device from the upper head side.

5. The virtual image display apparatus according to claim 1, further comprising, as a part of the optical unit, a projection lens configured to project light emitted from the video device to the light guide device, wherein
the optical unit housing section houses, on an inside thereof, a lens barrel configured to support an optical device configuring the projection lens, and
the lens barrel is supported by the frame.

6. The virtual image display apparatus according to claim 5, wherein
the lens barrel includes an engaging member for coupling the lens barrel to the light guide device, and
the light guide device includes an attaching section for attaching the light guide device to the frame.

7. The virtual image display apparatus according to claim 1, wherein the optical unit housing section houses the video device in a state in which a region of clearance is given to the video device.

8. The virtual image display apparatus according to claim 1, wherein the metal frame portion is an aluminum frame portion.

9. The virtual image display apparatus according to claim 1, wherein the light guide device includes:
a light guide member configured to guide light of a video and enable see-through of external light; and
a light transmitting member coupled to the light guide member and configured to supplement a see-through function for the external light.

10. The virtual image display apparatus according to claim 1, wherein the optical unit housing section and the light guide device are supported by the frame, the frame being arranged on a side closer to the nose of the observer than the optical unit housing section, thereby allowing the apparatus to be reduced in size as compared to a structure utilizing a case-like member.

* * * * *